May 5, 1931.  W. B. SMITH  1,804,284

METHOD OF FORMING A DISPLAY PACKER'S CONTAINER

Filed March 5, 1929

Inventor
WILLIAM B. SMITH.

By Sturtevant & Mason
Attorneys

Patented May 5, 1931

1,804,284

UNITED STATES PATENT OFFICE

WILLIAM B. SMITH, OF BALTIMORE, MARYLAND, ASSIGNOR TO CONTINENTAL CAN COMPANY, INC., OF NEW YORK, N. Y., A CORPORATION OF NEW YORK

METHOD OF FORMING A DISPLAY PACKER'S CONTAINER

Application filed March 5, 1929. Serial No. 344,458.

The invention relates to new and useful improvements in a method of forming a display packer's container, and more particularly to a method whereby a glass panel end may be hermetically secured to the container body for sealing the container, and through which the contents of the container may be viewed.

An object of the invention is to provide a method of attaching the glass panel to the body wall of the container whereby the panel is forced into sealing contact with an elastic gasket simultaneously with the forming of the wall of the body so as to secure and hold the panel hermetically seated on the container body.

A further object of the invention is to provide a method of securing a glass end panel to a container body wherein the edge portion of the container body is rolled into contact with the glass panel by a pressure applied to said edge portion so that the curl in the edge portion gradually moves down the edge portion until said edge portion contacts with said glass panel and seats and seals the same.

These and other objects will in part be obvious and will in part be hereinafter more fully disclosed.

In the drawings:—

Figure 1:
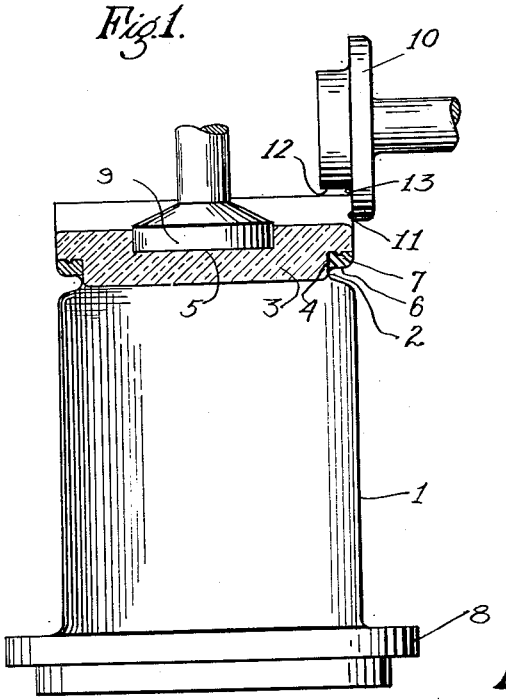
Fig. 1 is a view showing a container and end panel in section and diagrammatically devices for carrying out the method of securing the panel to the body of the container.

The invention is directed to a method of forming a display packer's container, which container includes a body portion having a glass end wall secured thereto. The container body is formed with an inwardly projecting bead providing a seat for the glass panel. Between the glass panel and the seat is an elastic packing. The edge portion of the body of the container is curled inwardly so as to form a continuous flange which lies flat against the outer face of the panel and holds the panel in sealing contact with the gasket and the seat formed on the container body.

This panel is secured to the container and the container is then filled with the food product which is to be sealed therein. A metal end closure is secured to the opposite end of the container by the ordinary double seaming operation. The glass panel is put in the container by the manufacturer and the metal end is secured to the container after it is filled by the packer.

The invention is directed particularly to the method of securing this panel to the container and this is accomplished by mounting the container so that it may be rotated and subjecting the edge portion of the container to a curling roller. The curling roller is moved in a direction lengthwise of the wall of the container and as it engages the edge of the container body it will curl said edge inwardly. The continued pressure of the curling roller against the edge will cause the curl in the edge portion to move down the body wall and a flange to be formed which is placed against the outer face of the panel. The pressure applied by the curling roller will force the end panel against the elastic packing compressing the same and forming a very tight seamed joint, and at the same time the curl in the edge portion of the container wall will move downward so that the flange will secure and hold the panel in this sealed position.

Referring more in detail to the drawings, the container as shown includes a cylindrical metal body 1 having an inwardly projecting bead 2 formed therein adjacent one end thereof. This end of the container is closed by a glass panel 3, the upper portion of which is of substantially the same diameter as the inner face of the container body. Said panel is provided with a shoulder portion 4, the diameter of which is substantially the same as the inner diameter of the inwardly projecting bead 2. In the outer face of the panel is a recess 5 which is circular and located centrally of the panel. The outer or upper face 6 of this inwardly projecting bead 2 forms a seat for the panel. Between the panel and the seat 6 is an elastic gasket or packing 7 which may be of any desired construction having a substantial thickness so that the gasket may be compressed when pressure is applied to the panel forcing the panel toward the seat. The panel with the gasket is placed in the container body and the container body in turn placed on a support 8 which is free to rotate. A chuck 9 is placed in the recess 5. Either the chuck or the support 8 is rotated by suitable means and this rotates the container body with the panel resting on the seat formed by the inwardly projecting bead. Associated with the chuck is a curling roller 10. Said curling roller is formed with a vertical face 11, a cylindrical face 12 which is substantially horizontal and a curved curling face 13, which joins the cylindrical face 12 and the vertical face 11. The roller is mounted so that it may be moved downwardly into contact with the edge of the container body as the container body is rotated.

Figure 2:
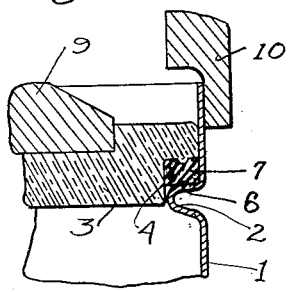
Fig. 2 is a vertical section showing a portion of the container, the end panel and curling roller when said roll first engages the edge portion of the container body.
Figure 3:
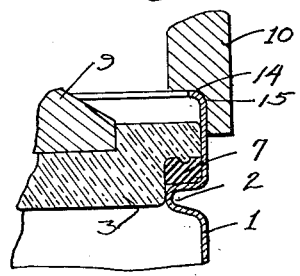
Fig. 3 is a similar view showing a curl formed in the edge portion by the curling roller.
Figure 4:
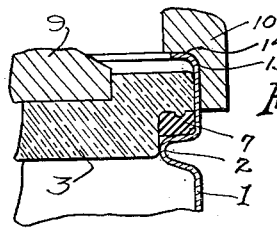
Fig. 4 is a view similar to Fig. 3, but showing the curl as having moved down the edge portion thus forming a flange which overlies the end panel.
Figure 5:
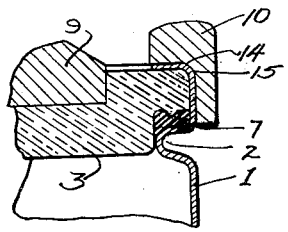
Fig. 5 is a view similar to Fig. 4, but showing the curl as having moved still further down the edge portion and the flange brought into contact with the end panel and also the end panel forced into sealing engagement with the elastic bead on the supporting seat.

In Fig. 2 the roller is shown as brought into engagement with the edge portion and the extreme upper edge of the body wall is brought against the curling portion 13 of the curling roller. A downward pressure of the roller will cause this edge portion to roll inwardly forming a curl 14. The downward pressure of the roller on the body wall is sustained by the body wall itself and not by the glass panel. The vertical face 11 prevents the body wall from bulging outwardly and holds it well up against the edge of the glass panel, while the extreme upper edge portion is rolled inwardly so as to overhang the glass panel. The continued pressure on the roller in a downward direction, that is, a direction lengthwise of the body of the container, causes this curl 14 to move downwardly toward the panel and the flange 15 formed thereby to further overhang the panel, as clearly shown in Fig. 4. A still further movement of the curling roller in a downward direction as the container rotates will bring this flange 15 into contact with the outer face of the panel. At this time the curl 14 is brought into engagement with the rounded outer upper edge of the glass panel. A still further pressure of the curling roller will now force the panel 3 against the packing 7 and compress the packing on the seat 6, thus making a very tight joint between the panel and the container body.

The shoulder portion 4 of the glass panel is directly in rear of the inner face of the bead 2 and any pressure of the curling roller on the wall of the container body which tends to collapse this bead would bring the bead into contact with the shoulder, which becomes an abutment and prevents the collapse of the bead. This pressure of the curling roller against the flange 15 and through the flange 15 against the glass panel which firmly seats it on the panel, also shifts the curl 14 so that when the roller is released this flange will remain in the extreme position to which it was forced by the roller and thus hold the panel in the tight sealing contact with the elastic packing which was obtained by the pressure of the curling roller.

It will be noted from the above that the pressure on the metal parts for deforming the same to secure the panel to the body portion of the container is taken almost wholly by the wall of the container body, and there is little or no pressure on the glass panel laterally of the container body. The only pressure on the glass is that incident to the flange engaging the panel and forcing the same against its elastic packing. The packing serves as a yielding resistance to this pressure, and thus it is that the panel may be secured to the body of the container by a hermetic seal and without any strain on the glass panel which might fracture or break the same.

The container as shown in the drawings forms the subject matter of my Patent Number 1,748,852, granted February 25, 1930.

It will be obvious that my improved method of securing the glass panel to the container body may be used for securing glass panels to other types of container bodies. The essential feature, however, resides in the curling of the metal without subjecting said panel to lateral breaking strains and thus forming a permanent securing means for holding said panel in sealed engagement with the container body.

Having thus described my invention, what I claim as new and desire to secure by Letters Patent, is:—

The method of forming a display packer's container having an inwardly projecting seat and a glass panel end having a depending shoulder portion the diameter of which is substantially the same as the seat, consisting in placing the panel with an elastic packing on the seat and subjecting the edge portion of the wall of the body of the container to a curling pressure in a direction lengthwise of the wall for curling said edge portion inwardly to form a flange, and gradually shifting the said curl and flange into contact with the glass panel and forcing and securing said glass panel in sealing contact with the elastic gasket and said seat, whereby the shoulder on said panel will contact with said inward projecting seat portion and prevent collapsing of the same during rolling of the flange into contact with the panel.

In testimony whereof, I affix my signature.

WILLIAM B. SMITH.